3,479,021
GAS EXTRACTION SYSTEM FOR OPEN TOP SHAFT FURNACES
Hans Escher, 19 Trentino Road, Turramurra,
New South Wales, Australia
Filed Dec. 27, 1966, Ser. No. 605,029
Claims priority, application Australia, Jan. 6, 1966,
144/66
Int. Cl. C21b 7/00; F27b 1/26; F27d 19/00
U.S. Cl. 266—31                                      7 Claims

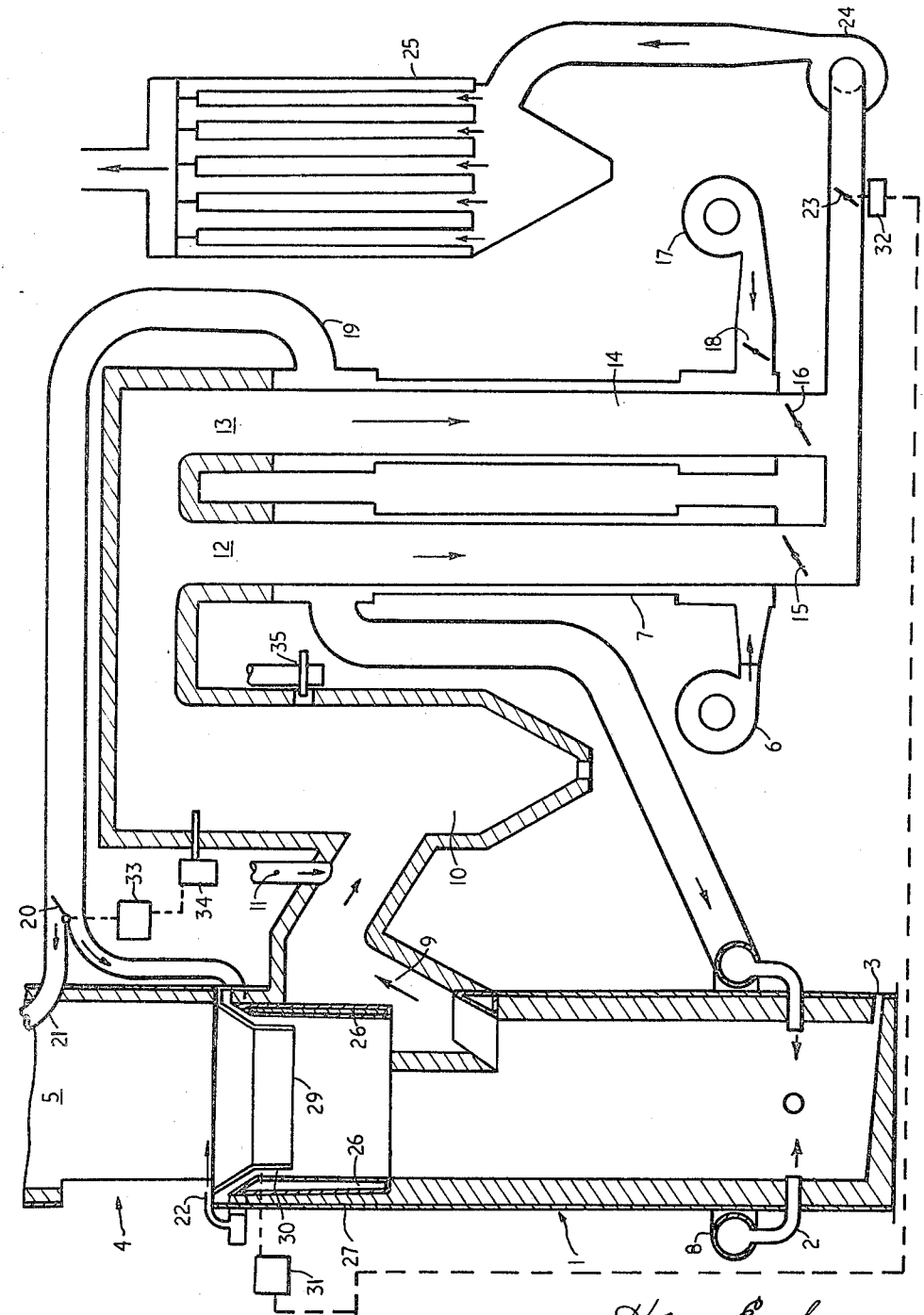

ABSTRACT OF THE DISCLOSURE

The invention relates to an open topped shaft furnace with a normal outlet for process gases located below the furnace top. To control the discharge of portion of the process gases through the open top or the entry of air through the open top, pressure measuring means are provided near the open top and the discharge through the normal outlet is varied according to variations in the pressure so measured.

BACKGROUND OF THE INVENTION

The invention relates to new and useful improvements to shaft furnaces as used for smelting of ores and melting of metals. More particularly the invention relates to the extraction of the process gases from open top shaft furnaces.

These gases normally contain useful heat in latent and sensible form, dust and obnoxious elements. To utilise the heat and eliminate air pollution it is necessary to extract the entire make of furnace gas and to achieve this a certain amount of atmospheric air has to be drawn into the furnace at the open top but this amount of air should be kept to a minimum to obtain efficient utilisation of the heat contained in the gases and also to keep the gas handling and gas cleaning equipment at an economic cost.

Various devices are known such as closed tops to reduce outwards leakage of gases or inwards leakage of atmospheric air into the furnace. These devices are not economic for furnaces operating intermittently, particularly when the furnace charge has to be melted down daily, as during the melting down period high internal temperatures are produced which would endanger the mechanical devices of the closed top.

SUMMARY

The object of this invention is to provide a structure at and below the open top of the furnace which under automatic control will enable maintenance of a full extraction of the furnace gases with a proportionately small amount of ingress of air under a wide range of operating conditions and charge levels in the furnace.

In a general form the invention is, in an open top shaft furnace including a normal outlet for process gases located between the top and bottom of the furnace, means for withdrawing the process gases through the normal outlet, a charge hopper mounted in the open top of the furnace and extending downwards and spaced near its lower end from the inside of the furnace, means for measuring the pressure in the space between the hopper lower end and the furnace and means actuated by the pressure measuring means for controlling the gas withdrawal so as to decrease the normal outflow of process gases when the measured pressure drops below a preset value and to increase the outflow when the measured pressure rises above the present value.

BRIEF DESCRIPTION OF THE DRAWING

The object of the invention will become clear from a consideration of the accompanying drawing showing a cross-sectional elevation of the furnace and auxiliary equipment.

PREFERRED EMBODIMENT

The shaft furnace 1 is equipped with tuyeres 2 located near the bottom and is provided with a tap hole 3 to extract the molten metal and slag. The raw materals are introduced through charge opening 4 which is located in the stack 5 above the charge level.

Blast air is provided by a blower 6 and this blast air is heated in heat exchanger 7 and delivered to a windbelt 8 which feeds the tuyeres 2. The gas produced in the furnace from the reaction between the blast air and the charge materials is extracted through an opening 9 and from there flows to the combustion chamber 10 where combustible matter is burned out by introducing air through valve 11. A portion of the combusted gases passes through opening 12 to the heat exchanger 7 to preheat the blast. Surplus combusted gas not required for blast preheat passes through opening 13 to heat exchanger 14. The proportioning of gases through heat exchangers 7 and 14 is effected by control of valves 15 and 16 as required to obtain the desired blast temperature.

Heat exchanger 14 is supplied with cooling air by blower 17 and the volume of air is regulated by valve 18. Heated air leaves the heat exchanger through duct 19 and this air can be diverted by valve 20 to a hot air outlet 21 which discharges into the furnace stack 5 or to jets 22 which produce a curtain of hot air above the top of hopper 29.

The necessary suction for the extraction of the furnace gas is provided by exhaust fan 24 which discharges the gases to a suitable dust collector 25.

The charge is introduced into the furnace through charge opening 4 by means of a suitable bucket. The bucket is usually provided with bottom doors which open and drop the charge into the charging shaft of the furnace. The charging shaft consists of water cooled jackets 26 which are attached to furnace shell 27. The charge hopper 29 is also attached to the shell 27 but extends some distance downwards and together with the shaft jackets 26 forms an annular space 30, bounded by the hopper 29 and the jackets 26.

The amount of air drawn into the furnace depends on the difference in pressure which exists between space 30 and atmospheric pressure just above the hopper 29. This difference is metered by a sensitive differential pressure detector 31 which sends a signal to controller-actuator 32. If the pressure in the space 30 is higher than the set point and gas escapes through charge hopper 29, then measuring and control elements 31 and 32 will cause valve 23 to open and increase the suction at the gas offtake 9 until the desired balanced conditions has been achieved. If the pressure in space 30 is too low and too much air is being drawn in, then the reverse control action will take place.

During periods of low blast volume or under conditions of poor gas quality (particularly relating to its calorific value) the ingress of cold air through hopper 29 could reduce combustion chamber temperature to an undesirably low level which would then call for auxiliary firing of the combustion chamber through burner 35. By diversion of hot air, supplied by the heat exchanger 14 to jets 22, hot air will be drawn through hopper 29. This will increase the temperature of the charge in the charging shaft and cause the temperature in the combusion chamber to rise. A further effect will be to reduce the weight of air passing through hopper 29, because the flow of air (expressed in lbs./sec.) will be inversely proportional to the square root of the air temperature expressed in degrees Kelvin. This reduction in weight of ingress air will be particularly valuable during periods of low blast volume when ingress air may be greater than combustion air required to burn combustibles in the furnace gas.

The above functions will be carried out automatically by a temperature controller 34, which measures the combustion chamber. When combustion chamber temperature tends to drop from a normal level temperature controller 34 will cause actuator 33 to move valve 20 and divert hot air to jets 22.

What I claim is:

1. An open top shaft furnace including means for controllably feeding air to a combustion chamber near the bottom of the furnace, a normal outlet for process gases located between the top and bottom of the furnace, means for withdrawing the process gases through the normal outlet, a charge hopper mounted in the open top of the furnace and extending downwards and spaced near its lower end from the inside of the furnace, the hopper lower end being above said normal outlet, means for measuring the pressure in the space between the hopper lower end and the furnace and means actauted by the pressure measuring means for controlling the gas withdrawal so as to decrease the normal outflow of process gases when the measured pressure drops below a preset value and to increase the outflow when the measured pressure rises above the preset value.

2. A furnace as in claim 1 wherein the furnace wall adjacent the lower end of the hopper is lined with water cooled jackets spaced laterally from the lower end of the hopper.

3. A furnace as in claim 1 including also a process gas discharge line connected at one end to the normal outlet and at the other end to an exhaust fan which is the gas withdrawing means.

4. A furnace as in claim 3 wherein the controlling means is a valve in the discharge line near the exhaust fan which is actauted by the pressure measuring means.

5. A furnace as in clam 3 wherein there are included in the discharge line in order from the normal outlet a combustion chamber and two discharge line branches in parallel, each forming the hot side of a heat exchanger.

6. A furnace as in claim 5 wherein the cold side of the first heat exchanger is connected at its entry end to an air blower and at its discharge end to a windbelt leading to tuyeres near the bottom of the furnace.

7. A furnace as in claim 6 wherein the cold side of the second heat exchanger is connected at its entry end to an air blower and at its discharge end to one end of a duct having two outlets at its other end, one duct outlet discharging into the furnace across the top of the charge hopper and means being provided to vary the proportions of the total duct discharge through the two duct outlets according to changes in the temperature of the process gases or in the combustion chamber.

References Cited

UNITED STATES PATENTS

| | | |
|---|---|---|
| 1,627,536 | 5/1927 | Vial et al. _____ 266—14 X |
| 1,872,057 | 8/1932 | Boegehold _____ 266—25 |
| 2,995,354 | 8/1961 | Tunder et al. _____ 266—25 X |
| 2,997,288 | 8/1961 | Schwechheimer et al. __ 266—30 |
| 3,332,676 | 7/1967 | Namy _____ 266—31 X |
| 3,339,904 | 9/1967 | Richards _____ 266—32 |
| 2,746,858 | 5/1956 | Schneible et al. ____ 266—17 X |

J. SPENCER OVERHOLSER, Primary Examiner

R. D. BALDWIN, Assistant Examiner

U.S. Cl. X.R.

263—29; 266—17